Patented Sept. 1, 1953

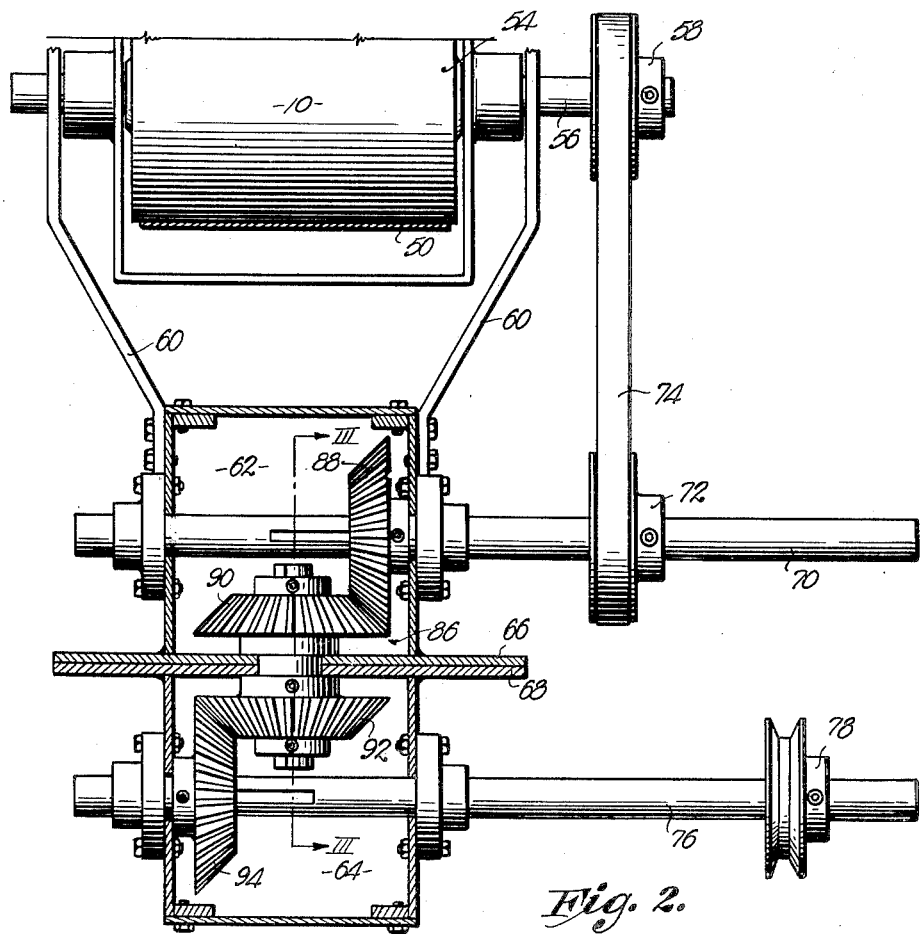
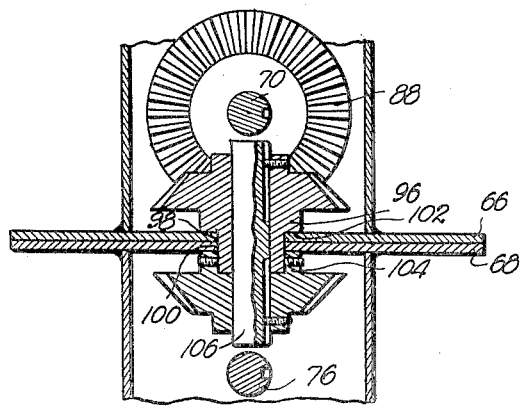
Fig. 2.
Fig. 3.
INVENTOR.
Rudolph Sammer

2,650,723

UNITED STATES PATENT OFFICE 2,650,723

MOUNTING UNIT FOR CORN PICKER ELEVATORS

Rudolph Sammer, Harrisonville, Mo., assignor of one-half to Thurman Johnson, Harrisonville, Mo., and one-half to W. A. Harrison Application October 24, 1949, Serial No. 123,110

4 Claims. (Cl. 214—42)

This invention relates to an attachment for a harvesting machine capable of mounting and driving a material conveyor of the machine, said mounting being formed to continuously maintain the discharge end of the conveyor in register with a wagon, trailer or other mobile receiver, irrespective of the terrain and of the direction of turn of the machine and trailer during operation.

The primary object of this invention is to provide an articulated driving assembly and mounting means for conveyors or elevators, capable of automatically causing lateral and vertical positioning of the discharge end of a harvester conveyor in alignment with a towed material receiving vehicle during continuous operation.

It is the most important object of the present invention to provide conveyor mounting means having parts on the harvester carrying the conveyor and parts on a towed trailer or the like for receiving conveyed material, cooperable to maintain the discharge end of the conveyor in alignment with the trailer over rough terrain and as turns are made in any direction by the harvester and by the trailer as a result of the turning of the harvester.

Another important object of the invention is to provide, in addition to the above mentioned novel mounting means, structure operably interconnecting the conveyor and the operating mechanism of the harvester or a separate prime mover thereon, to actuate the conveyor and at the same time permit free swinging movement of the conveyor on the harvester in a number of directions.

Other objects of the invention will appear during the course of the following specification, referring to the accompanying drawings, wherein:

Fig. 2 is a fragmentary, cross-sectional view taken on irregular line II—II of Fig. 1, looking in the direction of the arrows.

Fig. 3 is a fragmentary, cross-sectional view taken on line III—III of Fig. 2; and Fig. 4 is a fragmentary, detailed, cross-sectional view taken on line IV—IV of Fig. 1, parts being broken away for clearness.

Figure 1:
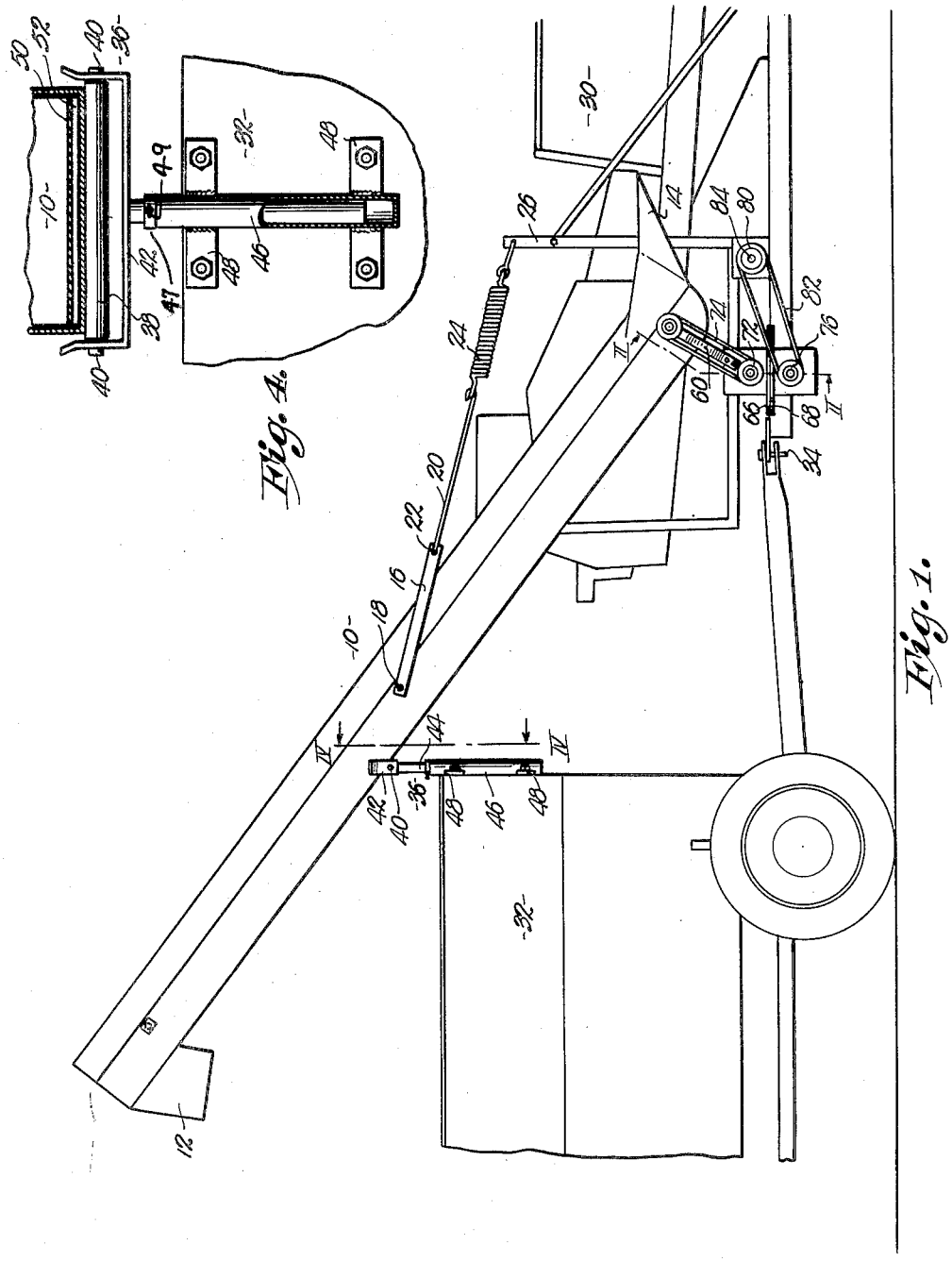
Fig. 1 is a fragmentary, side elevational view of a harvester showing its elevator and an attached trailer illustrating mounting means for said elevator made according to the present invention.

It has long been the practice to tow a mobile vehicle behind or at the side of a harvesting machine to receive the harvested grain from a conveyor attached to the machine. However, difficulty is experienced in the turning operation since the towed trailer or wagon moves from beneath the conveyor discharge and spillage of quantities of valuable material results. This situation became especially serious with the advent of contour farming which requires that the farming machinery must sometimes follow a rather tortuous path. It follows that large quantities of grain are lost during the harvesting operation when conventional transfer means is used.

This invention has as its purpose therefore, the elimination of such waste by the use of means to maintain the conveyor discharge and in register with the receiver while further providing a means for driving the conveyor as it assumes the various positions required by the turning operation.

In the form of the invention as shown in Fig. 1, a conveyor or elevator is broadly designated by the numeral 10 having a downwardly projecting discharge spout 12 at its upper and rearward end and a hopper 14 at the lower and forward end thereof to guide harvested material into the conveyor 10 from a harvester 30. Conveyor 10 has a support, including a pair of opposed plates 16, swingably attached thereto and intermediate its ends by bolts 18 or other means, the opposite end of plates 16 being swingably attached to a rod 20 as at 22. Rod 20 is pivotally secured to a spring 24 which in turn is attached to a rigid standard 26 on harvester 30.

A trailer, generally designated by the numeral 32, is attached to harvester 30 by means of a pivotal coupling 34 for free swinging movement on a number of axes in the usual manner.

Mounting structure for conveyor 10, generally designated by the number 36, is disposed on the forward, uppermost end of trailer 32. Structure 36 includes a T-shaped member having a stem 44 and a U-shaped cradle 42 on the normally uppermost end of stem 44. A horizontal roller 38 having pintles 40 journaled in the legs of cradle 42, supports conveyor 10 between said legs. Stem 44 is mounted for rotation on a vertical axis in a pipe 46, in turn secured to trailer 32 by brackets 48. Thus, cradle 42 extends above the upper edge of the front end of trailer 32 and supports conveyor 10 with spout 12 about trailer 32. A collar 47 is adjustably held in place on stem 44 by a set screw 49 and rides on the upper end of pipe 46, whereby the height of cradle 42 may be varied.

The conveyor or elevator 10, is additionally supported and actuated at its lowermost end, elevator 10 is of conventional construction and includes an endless belt or web 50 having a plurality of transverse slats 52 thereon for moving the material upwardly from the harvester thereto of the outlet spout 12. Endless belt 10 passes over opposed drums on the upper and lowermost ends respectively of the conveyor 10, drum 54 at the lowermost end being shown in Fig. 2 of the drawings.

A horizontal shaft 56 for the drum 54 extends beyond one outer face of the elevator 10 and carries a pulley 58. A pair of arms 60 having openings at the uppermost ends thereof for receiving the shaft 56 depend from the lowermost end of conveyor 10 and serve as a support therefor.

A pair of superimposed housings 62 and 64 are hollow and each may be entirely closed if desired and provided with removable side plates to render the gearing therewithin readily accessible. The proximal faces of the housings 62 and 64 are formed by a pair of superimposed, interengaged and relatively slidable plates 66 and 68 respectively. A horizontal shaft 70 traverses the housing 62 as provided with a pulley 72 exteriorly of the housing 62 for receiving an endless belt 74 trained thereover and also passing over the pulley 58 of conveyor shaft 56. The housing 64 is also provided with a shaft 76 that is parallel with and in direct underlying relationship to the shaft 70. Shaft 76 is provided with a sheave 78 that connects with a sheave 80 (see Fig. 1) through the medium of an endless belt 82. The sheave 80 is mounted on a drive shaft 84 for a suitable prime mover (not shown) which may constitute either a separate engine or motor, or, if desired, shaft 82 might well operably connect with the power mechanism of harvester 30. In any event, it is contemplated that upon rotation of drive shaft 84, conveyor belt 50 be actuated through the employment of a train of gears within housing 62 and 64 respectively and broadly designated by the numeral 86. Such train includes beveled gears 88, 90, 92 and 94 respectively, gear 88 being within the housing 62 and secured directly to the shaft 70, while gear 94 is disposed in housing 64 and attached to shaft 76.

The gear 90 is provided with a depending perforated hub 96 extending rotatably through a pair of aligned openings 98 and 100 in plates 66 and 68 respectively. An annular downwardly facing shoulder 102 rides upon the uppermost face of plate 66 and gear 90 is held in constant meshing relationship with respect to the gear 88.

The gear 92 has a hub 104 that circumscribes that end of the hub 96 extending into the housing 64 and is affixed directly thereto. Gear 92 meshes with the gear 94 and gears 90 and 92 are interconnected further through the medium of a pin 106 extending therethrough.

Upon rotation of drive shaft 84, like rotative movement is imparted to the shaft 76 through pulleys 78 and 80 and belt 82. As shaft 76 rotates together with its gear 94, rotative motion on a vertical axis is imparted to the gears 90 and 92. Gear 90 in turn rotates gear 88 to rotate the shaft 70 of gear 88 and consequently, the conveyor belt 50 is driven through the medium of pulleys 58 and 72 and the interconnecting belt 74 therefor.

It is apparent that the conveyor 10 is freely swingable on a vertical axis at its lowermost end with respect to the harvester 30 since such swinging movement of conveyor 10 is imparted to the plate 66 and such plate slides freely upon the uppermost face of plate 68. By the same token, the conveyor 10 is free to swing on its axis defined by the shaft 56 journaled in the arms 60. Both swinging movements of the conveyor 10 at the lowermost end thereof on intersecting vertical and horizontal axes, are entirely free of the driving mechanism for the belt 50 and irrespective of the position of the conveyor 10 with respect to the harvester 30, belt 50 will at all times be driven as above set forth.

In operation therefore, as the harvester progresses, the trailer 32 will be free to rise and lower over rough terrain because of the flexible coupling 34. In this same manner the spout 12 will be raised and lowered through the cradle assembly 36 while the roller 38 and the shaft 56 oscillate on substantial vertical, horizontal axes. In the event of a turn by the harvester 30, rendered possible because of the coupling 34, conveyor 10 being held between the legs of the cradle assembly 36, will swing on the vertical axis defined by the pin 106 as the plates 66 and 68 slide relatively and at the same time, the stem 44 of cradle 42 will rotate on its vertical axis with respect to the tube 46. Irrespective of the position of the trailer 32 with respect to the harvester 30, the outlet spout 12 will be maintained substantially in the same position as in normal operation above and in register with the trailer 32.

It is manifest further that as the elevator 10 swings on axes 38 and/or 56, spring 24 will flex sufficiently to assure that elevator 10 rides upon the roller 38 at all times. Furthermore, as the elevator 10 swings on axes 44 and/or 106, the pivotal connection between bracket 16 and standard 26 will permit such swinging movement without binding.

Another feature to be noted is the way in which the spring 24 holds the elevator 10 in a partially raised position when the coupling 34 is released and harvester 30 pulled away from the trailer 32.

Many details of construction might well be varied without departing from the spirit of this invention and it is, therefore, desired to be limited only by the scope of the appended claims.

Having thus described the invention, what is claimed as new and desired to be secured by Letters Patent is:

1. In a farm implement assembly having a harvester, a mobile receiver pivotally coupled with said harvester for towing thereby, and an elongated conveyor for moving harvested material from said harvester to said receiver, the improvement of which comprises structure for maintaining the conveyor in a position for discharging said material into the receiver during turning movement of the harvester and the towed receiver, said structure including a plate on the conveyor and on the harvester respectively, said plates being relatively superimposed and relatively rotatable on a substantially vertical axis; and a conveyor supporting cradle mounted on the receiver for free, unrestricted, pivotal movement on a substantially vertical axis, said cradle receiving the conveyor for movement relative thereto, whereby the conveyor is swung on said axes as the harvester turns relative to the receiver.

2. In a farm implement assembly having a harvester, a mobile receiver pivotally coupled with said harvester for towing thereby, and an elongated conveyor for moving harvested material from said harvester to said receiver, the improvement of which comprises structure for maintaining the conveyor in a position for discharging said material into the receiver during turning movement of the harvester and the towed receiver, said structure including a plate on the conveyor and on the harvester respectively, said plates being relatively superimposed and relatively rotatable on a substantially vertical axis; and a conveyor supporting cradle mounted on the receiver for free, unrestricted, pivotal movement on a substantially vertical axis, said conveyor resting within said cradle for free reciprocable movement on its longitudinal axis, whereby the conveyor is swung on said axes as the harvester turns relative to the receiver.

3. In a farm implement assembly having a harvester, a mobile receiver pivotally coupled with said harvester for towing thereby, and an elongated conveyor for moving harvested material from said harvester to said receiver, the improvement of which comprises structure for maintaining the conveyor in a position for discharging said material into the receiver during turning movement of the harvester and the towed receiver, said structure including a plate on the conveyor and on the harvester respectively, said plates being relatively superimposed and relatively rotatable on a substantially vertical axis; and a conveyor supporting cradle mounted on the receiver for free, unrestricted, pivotal movement on a substantially vertical axis, there being a roller forming a part of said cradle and mounted for rotation on a substantially horizontal axis, said conveyor resting on the roller for free reciprocation on its longitudinal axis, whereby the conveyor is swung on said axes as the harvester turns relative to the receiver.

4. In a farm implement assembly having a harvester, a mobile receiver pivotally coupled with said harvester for towing thereby, and an elongated conveyor for moving harvested material from said harvester to said receiver, the improvement of which comprises structure for maintaining the conveyor in a position for discharging said material into the receiver during turning movement of the harvester and the towed receiver, said structure including a plate on the conveyor and on the harvester respectively, said plates being relatively superimposed and relatively rotatable on a substantially vertical axis, and a conveyor supporting cradle mounted on the receiver for free, unrestricted, pivotal movement on a substantially vertical axis, said cradle receiving the conveyor for movement relative thereto, whereby the conveyor is swung on said axes as the harvester turns relative to the receiver; and mechanism operably interconnecting the harvester and the conveyor for motivating the latter, said mechanism including a rotatable shaft carried by the conveyor and the harvester respectively, a spindle pivotally interconnecting the plates and rotatable relative thereto, and a train of gears interconnecting the shafts with the spindle.

RUDOLPH SAMMER.

References Cited in the file of this patent

UNITED STATES PATENTS

| Number | Name | Date |
|---|---|---|
| 1,449,075 | Walker | Mar. 20, 1923 |
| 1,563,387 | MacEachen | Dec. 1, 1925 |
| 1,677,824 | Harrison et al. | July 17, 1928 |
| 2,389,483 | Bobrowski et al. | Nov. 20, 1945 |
| 2,397,420 | Jorgensen | Mar. 26, 1946 |
| 2,401,465 | Cwicig | June 4, 1946 |
| 2,465,156 | Huddle | Mar. 22, 1949 |
| 2,512,039 | Siren | June 20, 1950 |